United States Patent
McGrath et al.

[19]

[11] Patent Number: 5,875,599
[45] Date of Patent: Mar. 2, 1999

[54] MODULAR INSULATION PANELS AND INSULATED STRUCTURES

[75] Inventors: Ralph McGrath, Granville; Ralph Jutte, Hebron, both of Ohio

[73] Assignee: Owens-Corning Fiberglas Technology Inc., Summit, Ill.

[21] Appl. No.: 533,024

[22] Filed: Sep. 25, 1995

[51] Int. Cl.⁶ .................................................. E04B 2/60
[52] U.S. Cl. ...................... 52/586.2; 52/309.4; 52/406.2; 52/589.1; 52/794.1; 52/800.11
[58] Field of Search ............................... 52/309.4, 309.7, 52/309.8, 406.3, 589.1, 590.1, 590.2, 591.1, 784.15, 782.1, 788.1, 794.1, 405.2, 405.4, 790.1, 406.2, 586.2, 800.11

[56] References Cited

U.S. PATENT DOCUMENTS

| | | |
|---|---|---|
| 1,239,770 | 9/1917 | Coleman ................................. 52/406.3 |
| 1,321,097 | 11/1919 | Gonzalez . |
| 1,889,214 | 11/1932 | O'Leary . |
| 2,067,015 | 1/1937 | Munters . |
| 2,164,143 | 6/1939 | Munters . |
| 2,240,487 | 5/1941 | Benham . |
| 2,304,757 | 12/1942 | Arthur . |
| 2,451,286 | 10/1948 | Heritage . |
| 2,728,958 | 1/1956 | King . |
| 2,741,341 | 4/1956 | Anderson . |
| 2,768,046 | 10/1956 | Evans . |
| 2,912,725 | 11/1959 | Ries . |
| 3,004,877 | 10/1961 | Simms et al. ....................... 52/794.1 X |
| 3,078,003 | 2/1963 | Kesling . |
| 3,179,549 | 4/1965 | Strong et al. . |
| 3,273,297 | 9/1966 | Wehe, Jr. ......................... 52/784.15 X |
| 3,292,331 | 12/1966 | Sams ..................................... 52/405.2 |
| 3,462,897 | 8/1969 | Weinrott . |
| 3,791,090 | 2/1974 | Kniefel .................................... 52/590.2 |
| 3,819,466 | 6/1974 | Winfield et al. . |
| 3,979,869 | 9/1976 | Beehler . |
| 4,087,143 | 5/1978 | Barnard et al. . |
| 4,155,482 | 5/1979 | Swaney . |
| 4,190,305 | 2/1980 | Knight et al. . |
| 4,282,687 | 8/1981 | Teleskivi . |
| 4,335,831 | 6/1982 | Swaney . |
| 4,441,301 | 4/1984 | Benson . |
| 4,463,043 | 7/1984 | Reeves et al. . |
| 4,492,725 | 1/1985 | Ishihara et al. . |
| 4,513,041 | 4/1985 | Delluc . |
| 4,557,091 | 12/1985 | Auer . |
| 4,579,756 | 4/1986 | Edgel ................................. 52/788.1 X |
| 4,589,240 | 5/1986 | Kendall et al. . |
| 4,610,115 | 9/1986 | Thompson, Jr. .......................... 52/235 |
| 4,671,979 | 6/1987 | Adiletta . |
| 4,681,788 | 7/1987 | Barito et al. . |

(List continued on next page.)

FOREIGN PATENT DOCUMENTS

| | | |
|---|---|---|
| 149603 | 1/1952 | Australia . |
| 262569 | 6/1968 | Austria ................................. 52/405.2 |
| 0542501 | 5/1993 | European Pat. Off. . |
| 2508956 | 1/1983 | France ................................. 52/405.2 |
| 2115583 | 7/1992 | France . |
| 54982 | 7/1923 | Sweden ................................ 52/788.1 |
| 03098 | 7/1985 | WIPO .................................. 52/590.1 |
| 02856 | 3/1991 | WIPO .................................. 52/794.1 |

OTHER PUBLICATIONS

DiChristina, M., "Home Newsfront," *Popular Science*, Jul. 1992, p. 32.

*Primary Examiner*—Michael Safavi
*Attorney, Agent, or Firm*—C. Michael Gegenheimer; Curtis B. Brueske

[57] ABSTRACT

An insulation panel has a modular thermal insulation vacuum panel and a frame structure secured to the outer periphery. An outer edge portion of the panel and frame assembly is provided with a profile and is adapted to mate with an edge of an adjacent thermal insulation panel and frame assembly. Profile members may be inserted between insulation panels to form a wall assembly. Insulation panels have a central portion of reduced thickness so as to allow for application of conduits. The modular thermal insulation vacuum panel has insulating media enclosed within spaced panel segments.

2 Claims, 6 Drawing Sheets

U.S. PATENT DOCUMENTS

| | | |
|---|---|---|
| 4,798,753 | 1/1989 | Abuaf et al. . |
| 4,808,457 | 2/1989 | Kruck et al. . |
| 4,878,258 | 11/1989 | Casey . |
| 4,922,674 | 5/1990 | Thorn . |
| 4,955,675 | 9/1990 | Donaghy . |
| 5,007,226 | 4/1991 | Nelson . |
| 5,011,729 | 4/1991 | McAllister . |
| 5,048,233 | 9/1991 | Gidseg et al. . |
| 5,067,296 | 11/1991 | Brown et al. .......................... 52/309.7 |
| 5,082,335 | 1/1992 | Cur et al. .......................... 52/406.3 X |
| 5,090,981 | 2/1992 | Rusek, Jr. . |
| 5,094,899 | 3/1992 | Rusek, Jr. . |
| 5,107,649 | 4/1992 | Benson et al. . |
| 5,115,612 | 5/1992 | Newton et al. .......................... 52/235 |
| 5,252,408 | 10/1993 | Bridges et al. .......................... 428/621 |
| 5,273,801 | 12/1993 | Barry et al. . |
| 5,316,171 | 5/1994 | Danner, Jr. et al. . |
| 5,330,816 | 7/1994 | Rusek, Jr. . |
| 5,355,645 | 10/1994 | Farag . |
| 5,398,510 | 3/1995 | Gilley et al. . |
| 5,497,589 | 3/1996 | Porter .............................. 52/784.15 X |
| 5,500,305 | 3/1996 | Bridges et al. .......................... 428/621 |

MODULAR INSULATION PANELS AND INSULATED STRUCTURES

CROSS REFERENCE TO RELATED APPLICATIONS

This application is related to contemporaneously filed U.S. patent application Ser. No. 08/583,025, titled "Appliance Door," by Ralph McGrath et al., having attorney docket number 23858/23857, herein incorporated by reference; and is related to contemporaneously filed U.S. patent application Ser. No. 08/533,026, titled "Enhanced Insulation Panel," by Ralph McGrath et al., having attorney docket number 23856, herein incorporated by reference.

TECHNICAL FIELD

This invention relates generally to modular enhanced thermal insulation panels and insulated structures formed, at least in part, by one or more enhanced thermal insulation vacuum panels.

BACKGROUND ART

Thermal insulation vacuum panels are known in the art. One such panel is disclosed in U.S. Pat. No. 2,768,046. That panel comprises a metal shell or envelope formed from a pan-shaped metal sheet and a generally flat metal sheet. The sheets are welded to one another at their abutting outer edges. The edges define a flange which extends about the outer periphery of the panel. The space between the two sheets is filled with glass fiber insulation and the enclosed spaced is evacuated to a very low pressure.

The patentee teaches incorporating a plurality of his panels into a refrigerator cabinet. He notes in column 1, lines 45–49 of the '046 patent that heat transfer can occur from one wall or sheet of the panel to the other at the abutting edges of the sheets. In an attempt to minimize the effect of such edge leakage, the patentee encases the edges of each panel between opposing wall sections and provides glass fiber insulation between the wall sections adjacent to the panel edges. As to the door specifically, the patentee teaches forming the wall sections such that a portion of increased thickness is provided along the perimeter of the door. This substantial increase in the thickness of the walls of the cabinet reduces the useable space within the cabinet and, hence, is undesirable. Furthermore, in other contexts where vacuum panels might be used, encasing a vacuum panel between spaced apart walls and providing batts of glass fiber material adjacent the panel edges will not always be practical or desirable.

Vacuum insulation panels having uniform edge dimensions can be difficult to manufacture. Dimensional error may occur during one or more of the following manufacturing operations: cutting or otherwise forming the first and second sections of the metal envelope, positioning the two sections adjacent to one another and welding their abutting edges together, and evacuating the envelope. Because most vacuum panels do not have uniform outer dimensions, it is difficult to construct a wall, ceiling or other structure by positioning vacuum panels adjacent to one another.

Accordingly, there is a need in the art for a thermal insulation vacuum panel which has improved thermal performance, particularly at its outer edges, can be manufactured so as to have uniform edge dimensions to allow use of such panels in a modular fashion to construct walls, ceilings and other structures, can be easily manufactured in a number of panel sizes, and permits it to be easily and safely handled and transported. Further, there is a need for new structural designs which employ modular insulation panels.

DISCLOSURE OF INVENTION

These needs are met by the present invention whereby a modular thermal insulation vacuum panel is provided having improved thermal performance, especially at its outer edges, can be manufactured so as to have uniform edge dimensions to allow use of such panels in a modular fashion to construct walls, ceilings and other structures, can be easily manufactured in a number of panel sizes, and permits it to be easily and safely handled and transported. Further in accordance with the present invention, new structural designs are provided which employ modular insulation panels.

In accordance with a first aspect of the present invention, a modular enhanced thermal insulation vacuum panel is provided comprising: a thermal insulation vacuum panel having an outer periphery, and framing structure secured to at least a portion of the outer periphery of the panel and having an outer edge portion provided with a profile. A section of the outer edge portion is adapted to mate with a section of an outer edge portion of an adjacent modular enhanced thermal insulation vacuum panel having a similar profile.

Preferably, the framing structure extends about substantially the entire extent of the outer periphery of the thermal insulation panel. The framing structure may be formed from a material selected from the group consisting of polyurethane foam material, polystyrene foam material and phenolic foam material.

In one embodiment, the modular panel further comprises plastic structure secured to the outer edge portion of the framing structure.

The outer edge portion of the framing structure may an L-shaped profile in cross section. Alternatively, the outer edge portion may have a profile shaped so as to mate with a side portion of an I-beam.

In accordance with a second aspect of the present invention, an insulated structure is provided comprising first and second modular enhanced thermal insulation vacuum panels. The first modular enhanced panel comprises a first thermal insulation vacuum panel having a first outer periphery, and first framing structure secured to at least a portion of the first outer periphery of the panel and having a first outer edge portion provided with a first profile. The second modular enhanced panel comprises a second thermal insulation vacuum panel having a second outer periphery, and second framing structure secured to at least a portion of the second outer periphery of the panel and having a second outer edge portion provided with a second profile. The second profile is substantially similar to the first profile such that a section of the second edge portion is adapted to mate with a section of the first edge portion to interconnect or intermate the first and second panels to form an insulated structure.

The first enhanced panel may further comprise first plastic structure secured to the first outer edge portion of the first framing structure and the second enhanced panel may further comprise second plastic structure secured to the second outer edge portion of the second framing structure.

The insulated structure may further comprise one or more connectors which pass through the first and second outer edge portions of the first and second framing structures for connecting the first and second enhanced panels to one another. Alternatively, a layer of adhesive, such as a sponge adhesive, may be interposed between the first and second outer edge portions of the first and second framing structures to connect the first and second enhanced panels to one another.

The first edge portion may include a recess of a first predefined shape and the second edge portion may include a recess of a second predefined shape. The second recess is located so as to be positioned directly opposite to the first recess when the first and second enhanced panels are located adjacent to one another. The insulated structure may further comprise a key which is adapted to be simultaneously received in the first and second recesses when the first and second enhanced panels are positioned adjacent to one another so as to interconnect the first and second enhanced panels.

The first and/or second enhanced panels may have a central portion of reduced thickness. Further, the insulated structure may further comprise one or more outer facing panels secured to one or both of the first and second enhanced panels.

In accordance with a third aspect of the present invention, an easily assembled and disassembled enclosure is provided comprising: a plurality of walls capable of being releasably interconnected. Each wall comprises a thermal insulation vacuum panel having an outer periphery, and framing structure secured to at least a portion of the outer periphery of the vacuum panel and having an outer edge portion provided with a profile and adapted to mate with an outer edge portion of another wall having a similar profile.

Accordingly, it is an object of the present invention to provide a modular enhanced thermal insulation vacuum panel. It is further an object of the present invention to provide new structural designs which employ modular insulation vacuum panels. These and other objects of the present invention will be apparent from the following description, the accompanying drawings and the appended claims.

MODES FOR CARRYING OUT THE INVENTION

Figure 1:
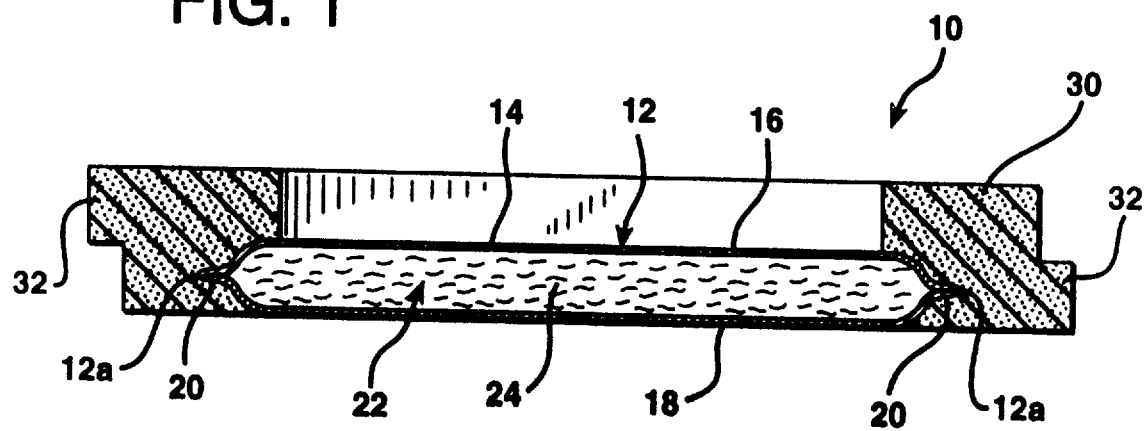
FIG. 1 is a cross sectional view of a modular enhanced thermal insulation vacuum panel formed in accordance with a first embodiment of the present invention.

Referring now to FIG. 1, there is shown generally at 10 a modular enhanced thermal insulation vacuum panel formed in accordance with the present invention. The modular enhanced insulation panel 10 is especially adapted for use in constructing structures such as insulated ceilings or walls of permanent or temporary structures. Such panels may also be used in the construction of refrigerated shipping containers or walk-in coolers or refrigerators. It is further contemplated that kits may be formed comprising one or more of the modular panels 10 for converting a cabinet or a portion of a van into a cooler or refrigerator or for constructing a temporary or permanent enclosure.

The modular enhanced panel 10 comprises a high R-value thermal insulation vacuum panel 12, which may be constructed as disclosed in any one of: U.S. patent application Ser. No. 08/271,163, filed Jul. 6, 1994, and entitled "Vacuum Insulation Panel and Method For Manufacturing"; U.S. patent application Ser. No. 08/405,129, filed Mar. 16, 1995, and entitled "Vacuum Insulation Panel Having Blended Glass Wool Filler and Method for Manufacturing"; U.S. patent application Ser. No. 08/405,114, filed Mar. 16, 1995, and entitled "Vacuum Insulation Panel Having Expanded Surface Area Wool Filler and Method for Manufacturing"; and U.S. Pat. Nos. 5,330,816, 5,286,320, 5,094,899 and 5,090,981, the disclosures of which are incorporated herein by reference.

The vacuum panel 12 comprises a generally rectangular metal shell or envelope 14 formed from upper and lower metal panels 16 and 18. The panels 16 and 18 are welded to one another at their abutting outer edge portions. The abutting outer edge portions form a flange 20 which defines the outer periphery 12a of the panel 12. The space 22 between the two panels 16 and 18 is filled with thermal insulating media 24 and the enclosed spaced is evacuated to a very low pressure.

A framing structure 30 is secured about the outer periphery 12a of the vacuum panel 12 and, in the embodiment illustrated in FIG. 1, has an outer edge portion 32 provided with an L-shaped profile. As will be discussed below, a section of the outer edge portion 32 is adapted to mate with a section of an outer edge portion of an adjacent modular enhanced thermal insulation vacuum panel having a similar profile.

The framing structure 30 may comprises discrete framing members which are adhesively, frictionally or otherwise fastened or joined to one another and to the outer periphery 12a of the vacuum panel 12. The discrete framing member may be preformed from a foamed material, such as a polyurethane, polystyrene or phenolic foam material. While not shown in the illustrated embodiment, reinforcement materials, such as glass fibers, may be included in the foamed material. It is also contemplated that the polymeric material, rather than being preformed, may be foamed about the outer periphery 12a of the vacuum panel 12 or a non-foamed polymeric material may be molded about the outer periphery 12a of the vacuum panel 12. The foamed or molded material may encase only the outer periphery 12a of the panel 12, as shown in FIG. 1. Alternatively, the foamed or molded material may cover essentially the entire outer surface of the panel 12 and material may be scalloped or otherwise removed from one or both sides of the modular panel 10 to reduce the thickness of the modular panel 10 in its central region.

It is further contemplated that the framing structure 30 may be formed from discrete framing members preformed from a fiberglass reinforced plastic such as a polyester-based sheet molding compound (SMC), a rigid unreinforced polymeric material such as high density polyethylene, a coated metal, wood, etc. Processes for forming discrete framing members from polymeric materials include molding, extrusion, and pultrusion processes. It is additionally contemplated that the framing structure 30 may be secured to only one or more portions of the outer periphery 12a of the vacuum panel 12.

The width, depth and length of the framing structure 30 can be easily varied, such as by cutting or grinding or by using forming apparatus of a different shape or size. Accordingly, metal envelopes 14 having generally the same outer dimensions may be used in the manufacture of modular enhanced vacuum panels 10 having different outer dimensions.

Vacuum insulation panels having metal envelopes 14 of uniform edge dimensions can be difficult to manufacture, as discussed above in the "Background Art" portion of the present application. This is in contrast to framing structures 30, which can easily be formed having uniform outer dimensions. Accordingly, with the present invention, it is possible to economically manufacture modular enhanced thermal insulation vacuum panels 10 having uniform outer dimensions, even though their metal envelopes 14 may have non-uniform dimensions.

Figure 2:
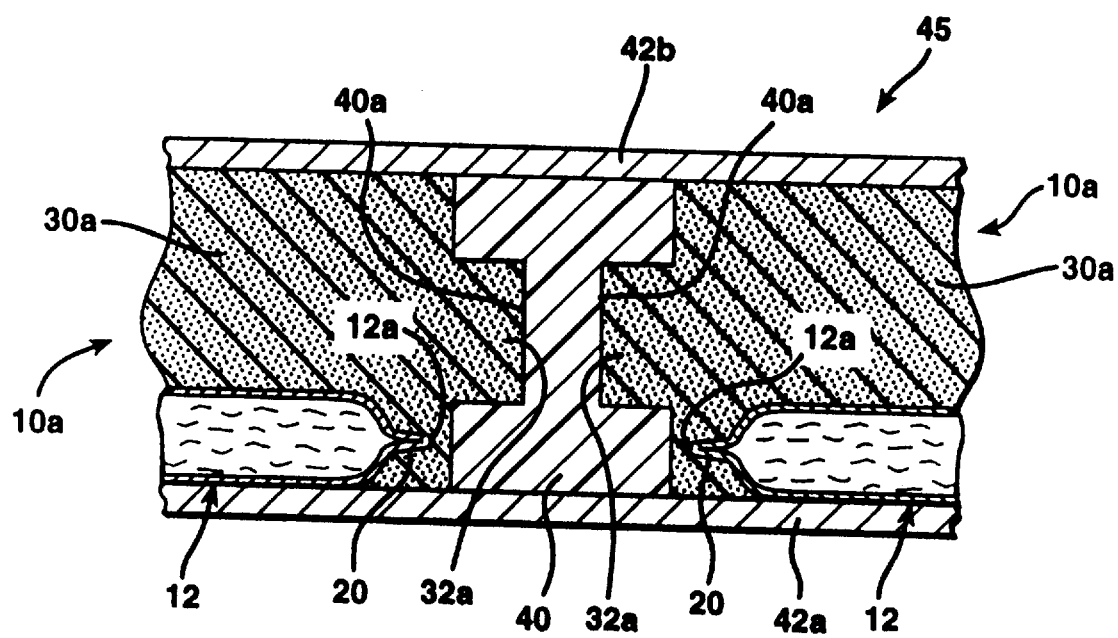
FIG. 2 is a cross sectional view of portions of two modular enhanced thermal insulation vacuum panels positioned on opposite sides of an I-beam.

Referring now to FIG. 2, where like elements are referenced by like numerals, portions of two modular panels 10a are shown positioned on opposite sides 40a of an I-beam 40. Each modular panel 10a is provided with framing structure 30a secured about the outer periphery 12a of a vacuum panel 12. The framing structure 30a has an outer edge portion 32a provided with a profile which allows the modular panel 10a to mate with a side portion 40a of the I-beam 40. Also provided are inner and outer facing panels or sheets 42a and 42b, which may comprise drywall, sheet paneling such as plywood, or facing sheets made from other materials, such as a metallic material or a reinforced or unreinforced polymeric material. The modular panels 10a, I-beam 40 and facing sheets 42a and 42b define a structure 45 which may form part of a ceiling or wall of a temporary or permanent housing structure, warehouse, walkin cooler or the like.

Figure 3:
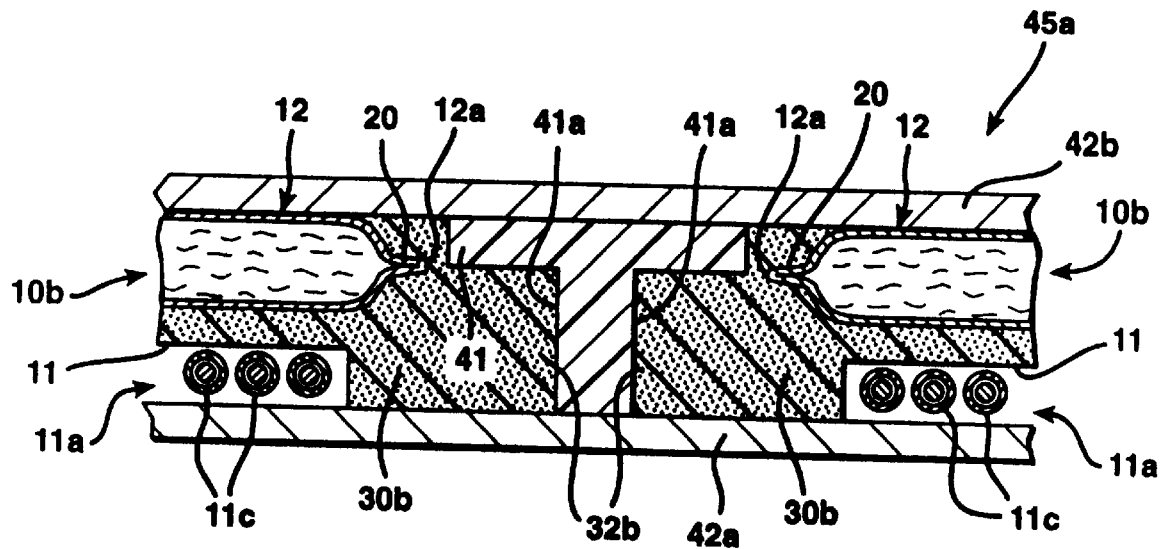
FIG. 3 is a cross sectional view of portions of two modular enhanced thermal insulation vacuum panels positioned on opposite sides of a beam having a T-shape.

With reference to FIG. 3, where like elements are referenced by like numerals, portions of two modular panels 10b are shown positioned on opposite sides 41a of a beam 41 having a T-shape. Each modular panel 10b is provided with framing structure 30b secured about the outer periphery 12a of a vacuum panel 12. The framing structure 30b has an outer edge portion 32b provided with a profile which allows the modular panel 10b to mate with a side 41a of the beam 41. The beam 41 may be formed from wood, a reinforced polymeric material or a metal such as steel. Also provided are inner and outer facing sheets 42a and 42b, which may comprise drywall, sheet paneling such as plywood, or facing sheets made from other materials, such as a metallic material or a reinforced or unreinforced polymeric material. Each of the modular panels 10b is formed with a recess 11 which defines with the inner facing sheet 42a a cavity 11a in which electric wires 11c, conduit, piping and the like may be located. The modular panels 10b, beam 41 and facing sheets 42a and 42b define a structure 45a which may form part of a ceiling or wall of a temporary or permanent housing structure, warehouse, walk-in cooler and the like.

Figure 4A:
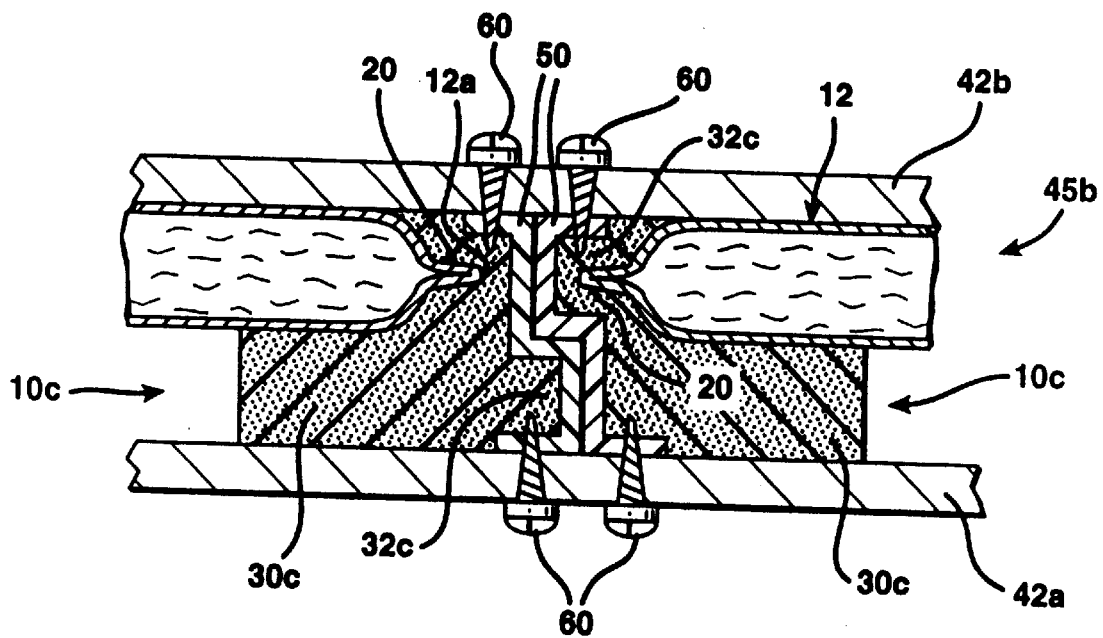
FIG. 4A is a cross sectional view of portions of two interconnected modular panels constructed in accordance with an alternative embodiment of the present invention.
Figure 4B:
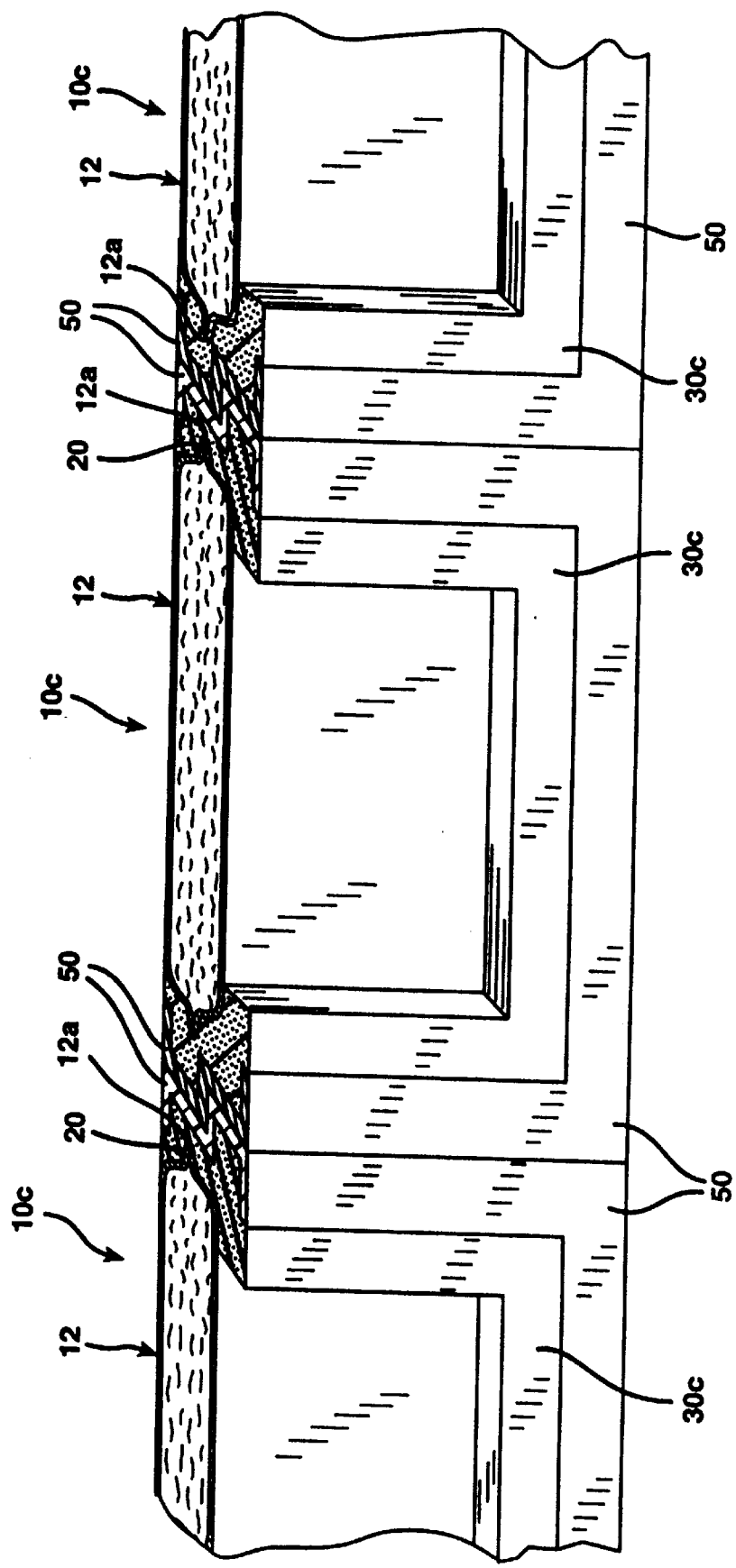
FIG. 4B is a perspective view, partially in cross section, of portions of interconnected modular panels.

Referring now to FIGS. 4a and 4b, where like elements are referenced by like numerals, intermated modular panels 10c are shown. Each modular panel 10c is provided with framing structure 30c secured about the outer periphery 12a of a vacuum panel 12. The framing structure 30c has an outer edge portion 32c provided with a generally L-shaped or stepped profile. Reinforced plastic structure 50 is secured about the outer edge portion 32c of the framing structure 30c. Portions of two modular panels 10c are shown mated with one another in FIG. 4A, and three such panels 10c are shown mated with one another in FIG. 4B. Also provided are inner and outer facing sheets 42a and 42b, shown only in FIG. 4A, which may comprise drywall, sheet paneling such as plywood, or facing sheets made from other materials, such as a metallic material or a reinforced or unreinforced polymeric material. Securing screws 60 extend through the facing sheets 42a and 42b, the plastic structures 50 and into the framing structures 30c to connect the modular panels 10c and the facing sheets 42a and 42b together. The reinforced structures 50 provide strong layers into which the screws 60 extend and, hence, improve fastener retention over foam alone. The interconnected panels 10c and facing sheets 42a define a structure 45b which may form part of a ceiling or 10 wall of a temporary or permanent housing structure, warehouse, walk-in cooler or the like.

Figure 5:
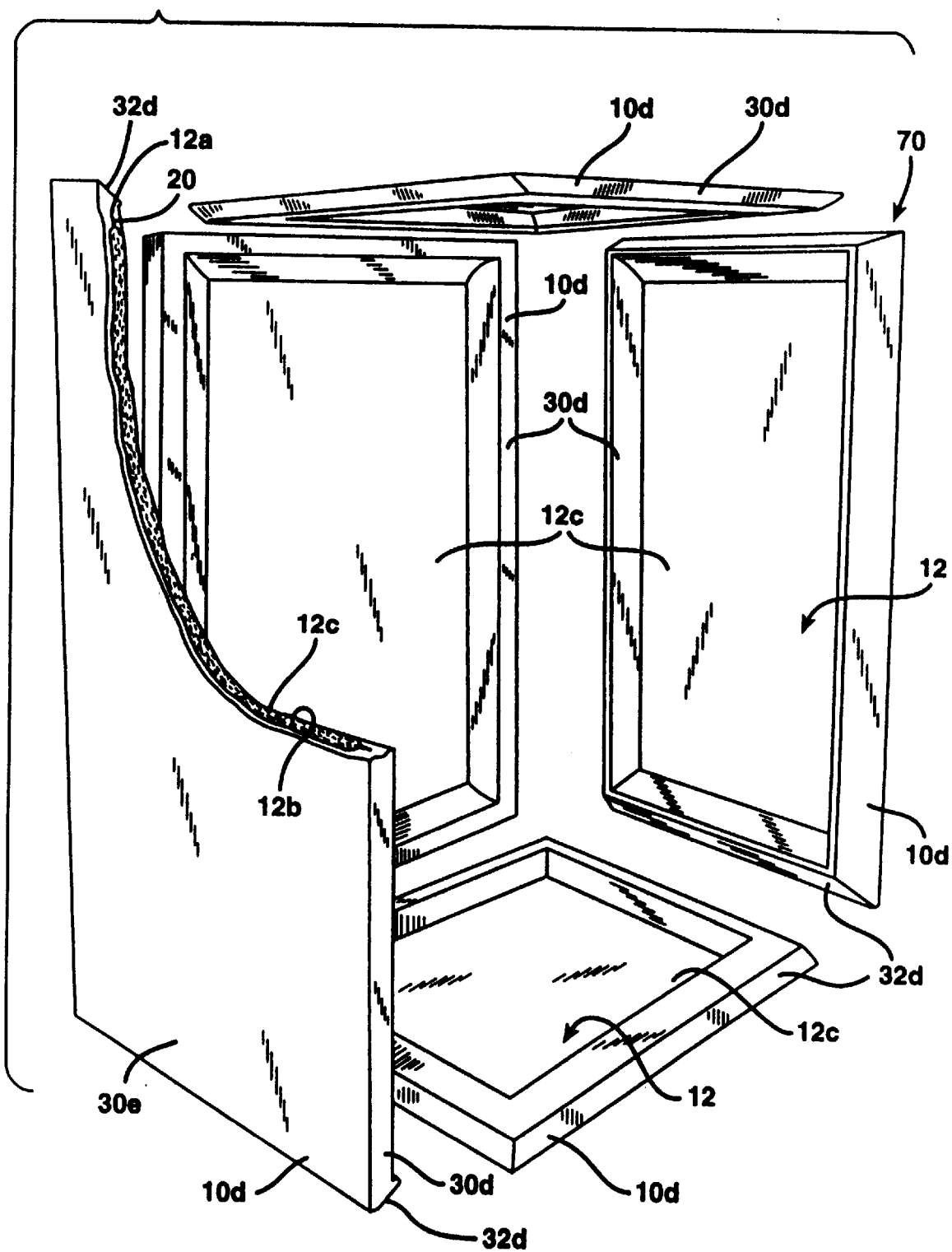
FIG. 5 is an exploded view of an enclosure formed from a plurality of modular panels.

Referring now to FIG. 5, an exploded view of an enclosure 70 formed from a plurality of modular panels 10d is shown. Each modular panel 10d is provided with framing structure 30d secured about the outer periphery 12a of a vacuum panel 12. In the illustrated embodiment, the framing structure 30d is formed from a foamed material, such as one of the foamed materials set out above, and the foamed material extends across the outer surface 12b of each vacuum panel 12 to form a foamed backing 20 sheet 30e. The framing structure 30d has an outer edge portion 32d. Each of at least three sides or sections of the outer edge portion 32d extends at an angle of approximately 45° to the inner face of the vacuum panel 12c. In the illustrated embodiment, sides or sections of the outer edge portions 32d of adjacent panels 10d are adhesively secured to one another to form the enclosure 70. A conventional adhesive, such as a pressure sensitive adhesive having a release sheet applied over the adhesive before assembly, or a sponge adhesive may be used. While not shown in the drawings, a facer sheet, such as a peel and stick decorative layer (i.e., an ornamental paper, vinyl or foil sheet having adhesive coated thereon, with releasable paper covering the adhesive before application) may be applied over the foamed backing layer 30e. It is also contemplated that the foamed backing sheet 30e may be excluded and a facer sheet may be provided in its place.

Figure 6:
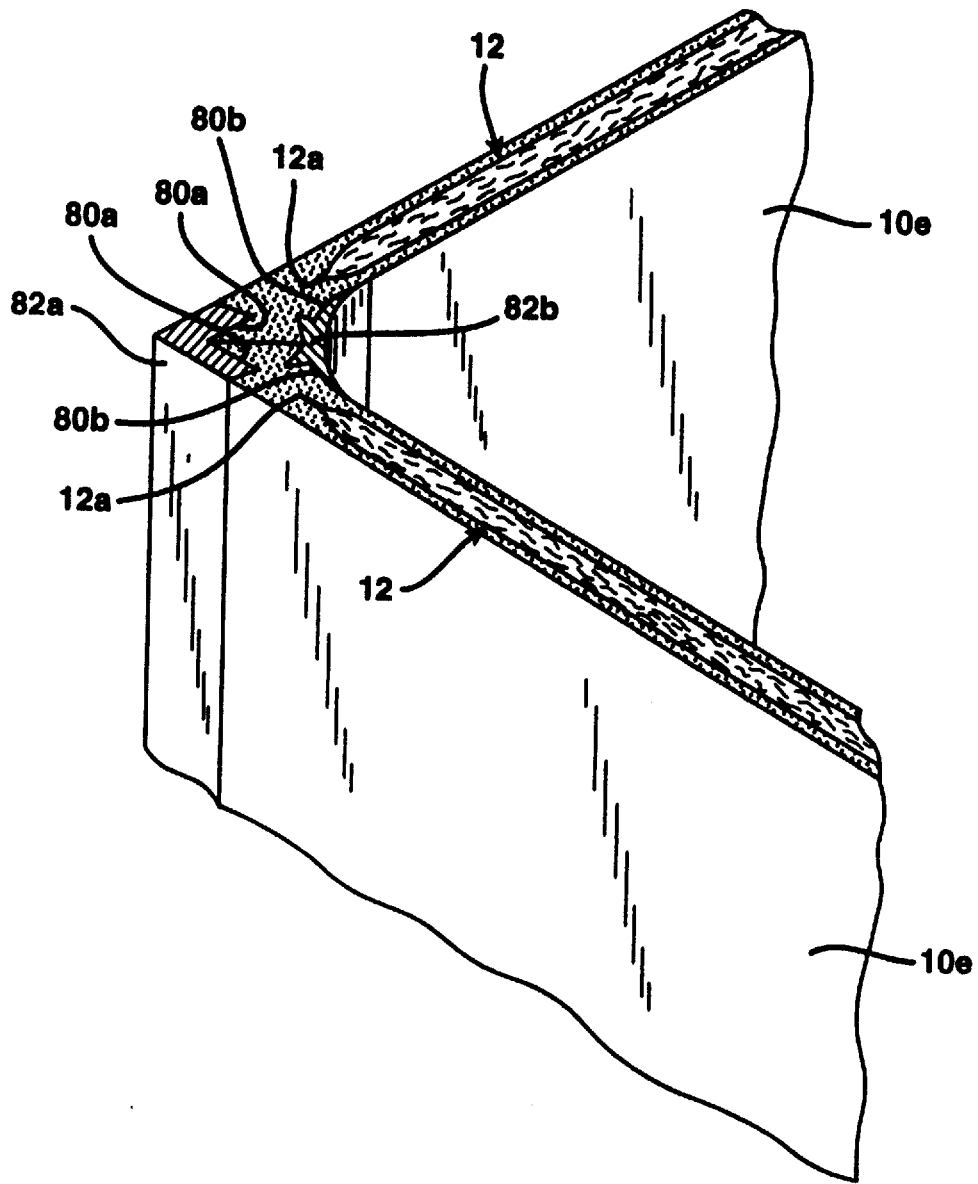
FIG. 6 is a perspective view of portions of first and second modular panels interconnected via first and second keys.

In FIG. 6 an alternative arrangement for connecting two adjacent modular panels 10e is shown. Each modular panel 10e is constructed in essentially the same manner as panel 10 shown in FIG. 1. Further, each panel 10e includes first and second recesses 80a and 80b having first and second predefined shapes. When the two adjacent panels 10e are correctly positioned relative to one another, the two first recesses 80a are positioned opposite to one another such that a first key 82a can be simultaneously received in the two first recesses 80a to interconnect the two adjacent panels 10e together. Likewise, when the two adjacent panels 10e are correctly positioned relative to one another, the two second recesses 80b are positioned opposite to one another such that a second key 82b can be simultaneously received in the two second recesses 80b to further interconnect the two adjacent panels 10e together.

Figure 7:
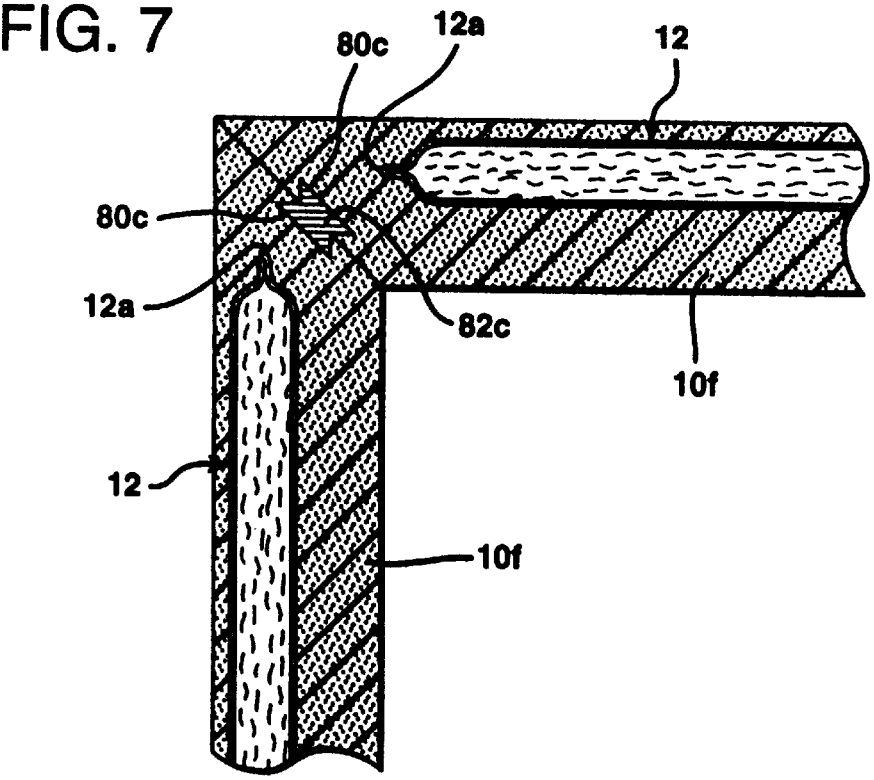
FIG. 7 is a cross sectional view of portions of first and second modular panels interconnected via a key having an alternative shape; and, FIG. 8 is a perspective view, partially in cross section, of portions of joined first and second modular panels with the first panel having a scored extension.

In FIG. 7 another alternative arrangement for connecting two adjacent modular panels 10f is shown. Each modular panel 10f is formed in essentially the same manner as panel 10 shown in FIG. 1. Further, each panel 10f includes a recess 80c having a predefined shape. When the two adjacent panels 10f are correctly positioned relative to one another, the two recesses 80c are positioned opposite to one another such that a key 82c can be simultaneously received in the two recesses 80c to interconnect the two adjacent panels 10f together.

Figure 8:
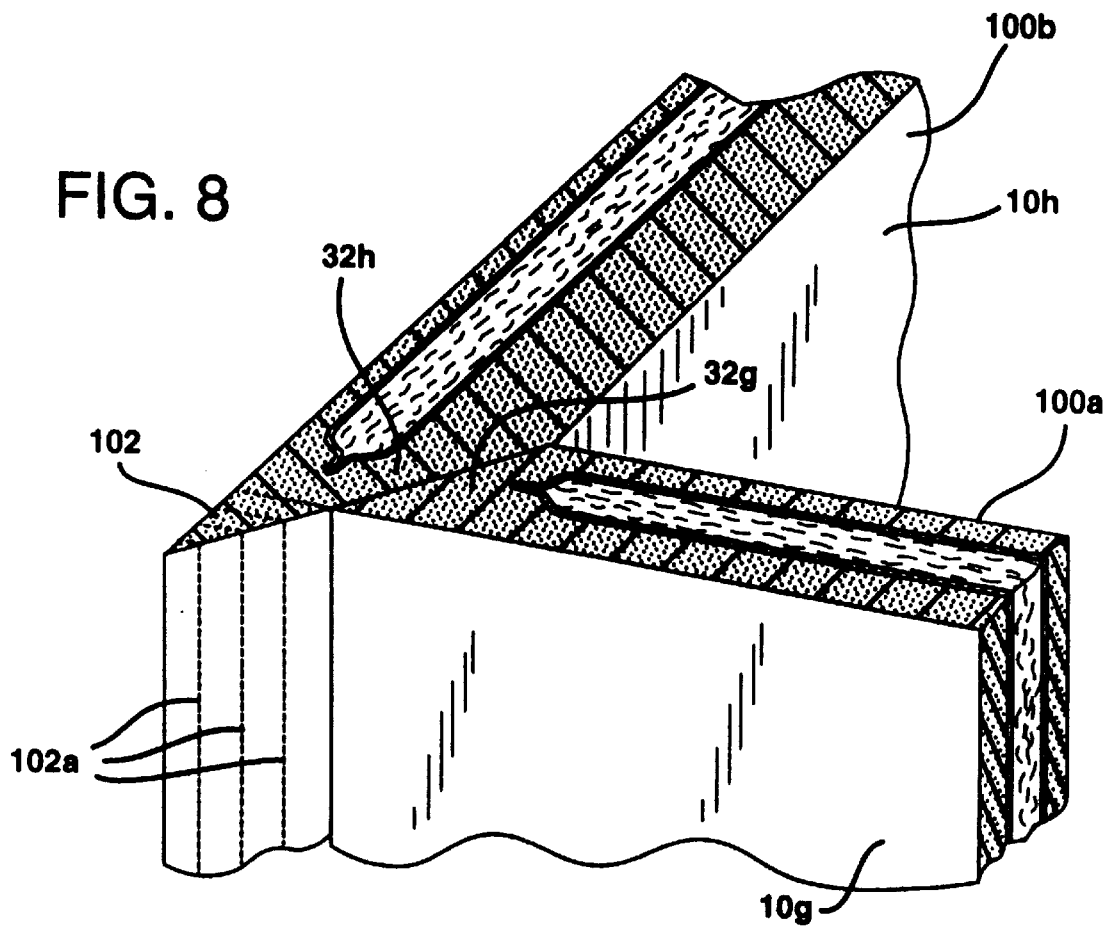

Referring now to FIG. 8, first and second modular panels 10g and 10h are shown which are adapted for use in converting a residential kitchen cabinet or a commercial storage cabinet into a cooler or refrigerator or for use in assembling an insulated enclosure such as a cooler. The first and second panels 10g and 10h are constructed in essentially the same manner as panel 10 illustrated in FIG. 1. The first panel log includes an outer edge portion 32g having a profile which defines an angle of approximately 45° with the inner face 100a of the panel 10g. The second panel likewise includes an outer edge portion 32h having a profile which defines an angle of approximately 45° with the inner face 100b of the panel 10h. The outer edge portion 32h further includes an extension 102 having a plurality of spaced-apart score lines 102a. The extension 102 may be cut along an appropriate score line 102a so that the panel 10h may be correctly sized to fit within the cabinet into which it is to be inserted. The panels 10g may be frictionally or adhesively secured within the cabinet or fastened to the cabinet by conventional fasteners.

It is further contemplated that a modular panel constructed in accordance with the present invention may be combined with an energy transfer thermoelectric assembly, such as disclosed in U.S. Pat. No. 5,398,510, entitled "Superinsulation Panel With Thermoelectric Device and Method," or in International Application No. PCT/US95/00579, entitled "Thermoelectric Refrigerator," the disclosures of which is herein incorporated by reference.

It is further contemplated that the framing structure of the enhanced panel of the present invention may be formed from a high density foamed material, e.g., a 10 pounds/ft$^3$ (160 kg/m$^3$) foamed material, so as improve its strength and fastener retention ability. Conventional screws adapted for use with foam may be used to secure together modular panels which do not include reinforced structures 50.

Having described the invention in detail and by reference to the preferred embodiments thereof, it will be apparent that other modifications and variations are possible without departing from the scope of the invention defined in the appended claims.

We claim:

1. An insulated structure comprising:

firstaand second separate modular enhanced thermal insulation vacuum panels, said first enhanced panel comprising a first thermal insulation vacuum panel having a first outer periphery, and first framing structure secured to at least a portion of said first outer periphery of said panel and having a first outer edge portion provided with a first profile, said second enhanced panel comprising a second thermal insulation vacuum panel having a second outer periphery, and second framing structure secured to at least a portion of said second outer periphery of said panel and having a second outer edge portion provided with a second profile which substantially similar to said first profile such that a section of said second edge portion is adapted to mate with a separate section of said first edge portion to interconnect said first and second panels to form an insulated structure, a layer of adhesive interposed between said first and second outer edge portions of said first and second framing structures for connecting said first and second enhanced panels to one another, and wherein said first enhanced panel has a central portion of reduced thickness.

2. An insulated structure comprising:

first and second separate modular enhanced thermal insulation vacuum panels, said first enhanced panel comprising a first thermal insulation vacuum panel having a first outer periphery, and first framing structure secured to at least a portion of said first outer periphery of said panel and having a first outer edge portion provided with a first profile, said second enhanced panel comprising a second thermal insulation vacuum panel having a second outer periphery, and second framing structure secured to at least a portion of said second outer periphery of said panel and having a second outer edge portion provide with a second profile which is substantially similar to said first profile such that a section of said second edge portion is adapted to mate with a separate section of said first edge portion to interconnect said first and second panels to form an insulated structure, said first edge portion including a recess of a first predefined shape and said second edge portion including a recess of a second predefined shape and is located so as to be positioned directly opposite to said first recess when said first and second enhanced panels are intermated, and further comprising a key which is adapted to be simultaneously received in said first and second recesses when said first and second enhanced panels are intermated so as to interconnect said first and second enhanced panels, and wherein said first enhanced panel has a central portion of reduced thickness.

\* \* \* \* \*

UNITED STATES PATENT AND TRADEMARK OFFICE
CERTIFICATE OF CORRECTION

PATENT NO : 5,875,599

DATED : March 2, 1999

INVENTOR(S) : Ralph McGrath and Ralph Jutte

It is certified that error appears in the above-identified patent and that said Letters Patent is hereby corrected as shown below:

Col. 7, line 48, "firstaand" should be --first and--.

Signed and Sealed this

Twenty-second Day of August, 2000

Q. TODD DICKINSON

*Attest:*

*Attesting Officer*         *Director of Patents and Trademarks*